United States Patent
Wilkinson et al.

(10) Patent No.: US 11,151,062 B2
(45) Date of Patent: Oct. 19, 2021

(54) OPTIMIZED LOCKING FOR REPLICATION SOLUTIONS

(71) Applicant: International Business Machines Corporation, Armonk, NY (US)

(72) Inventors: John P. Wilkinson, Salisbury (GB); Andrea Sipka, Nursery Gardens (GB)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 15/944,824

(22) Filed: Apr. 4, 2018

(65) Prior Publication Data
US 2019/0310952 A1 Oct. 10, 2019

(51) Int. Cl.
G06F 13/16 (2006.01)
G06F 11/14 (2006.01)
G06F 16/182 (2019.01)

(52) U.S. Cl.
CPC ........ *G06F 13/161* (2013.01); *G06F 11/1448* (2013.01); *G06F 16/184* (2019.01)

(58) Field of Classification Search
CPC .. G06F 13/161; G06F 16/184; G06F 11/1448; G06F 11/1458; G06F 17/30212
See application file for complete search history.

(56) References Cited

U.S. PATENT DOCUMENTS

| | | | |
|---|---|---|---|
| 6,823,336 B1 * | 11/2004 | Srinivasan | G06F 3/0611 |
| 7,823,008 B2 * | 10/2010 | Burr | G06F 11/2064 714/6.12 |
| 8,468,313 B2 | 6/2013 | Yim et al. | |
| 8,595,185 B2 * | 11/2013 | Hayardeny | G06F 11/2069 707/613 |
| 8,667,236 B2 | 3/2014 | Phelps et al. | |
| 9,229,827 B2 | 1/2016 | Burr et al. | |
| 9,552,173 B2 | 1/2017 | Brown et al. | |
| 2003/0079088 A1 * | 4/2003 | Malik | G06F 12/0862 711/137 |
| 2008/0209145 A1 | 8/2008 | Ranganathan et al. | |

OTHER PUBLICATIONS c-jumpcom NTFS File System Overview Jan. 15, 2018 www.c-jump.com/bcc (Year: 2018).*
Wilkinson, John, "IBM Spectrum Virtualize HyperSwap Configuration", Document version1.0.0, Jun. 2015, © Copyright IBM Corporation, 2015, 31 pages.
"What IBM Flash System V9000 Can Do for Your Business", IBM Flash System V9000, IBM Marketplace, <https://www.ibm.com/us-en/marketplace/flash-storage-virtualization>, Printed Aug. 14, 2017, 1 page.

* cited by examiner

*Primary Examiner* — Hosain T Alam
*Assistant Examiner* — Chongsuh Park
(74) *Attorney, Agent, or Firm* — Joseph P. Curcuru; Gilbert Harmon, Jr.

(57) ABSTRACT

A method for improving latency in storage systems, the method comprising, receiving one or more write commands from a host. Determining that one or more bits are not set for a grain associated to a write. Responsive to determining the one or more bits are not set for the grain associated to the write, sending a message to node M requesting node M to set the one or more bits for the grain associated to the write, requesting write data be transferred from the host. Transferring write data from the host. Submitting the write data to a local storage. Replicating the write data to a remote system and complete a write to the host, and notifying node M to clear the one or more bits for the write after a predetermined delay.

20 Claims, 3 Drawing Sheets

OPTIMIZED LOCKING FOR REPLICATION SOLUTIONS

BACKGROUND

The present invention relates generally to the field of data replication and storage, and more particularly to improving latency in replication and storage systems.

For replication systems in storage systems, there exists a need to store what host writes are outstanding, and are therefore not known to be synchronized between the two systems. This knowledge must be hardened in some way, to make it able to survive power or hardware failures. For clustered storage systems, this is typically done by storing knowledge/information on at least two nodes of the cluster. In turn, this means that a message must be sent (and acknowledgement received) between the nodes in the cluster, so this knowledge/information can be shared before either the production copy or the disaster recovery (DR) copy can be updated.

Additionally, for a continuously-replicating asynchronous replication solution each write must have a sequence number assigned before it can be processed. This involves a round-trip message to a node that is assigning sequence numbers. These messages each typically take 0.1-0.3 milliseconds (ms) to complete. In the era of spinning disks and write times of multiple milliseconds, these two messages had a small, almost unnoticeable effect on latency and performance. With today's flash-based storage offering write times of 0.2 ms even behind a virtualization appliance, adding these extra messages can increase the total latency to a multiple of 2-4× the amount it would be without replication. Therefore, it's vital to lower and/or remove the overheads of these messages if replication is to stay relevant for flash-based environments.

SUMMARY

According to one embodiment of the present invention, a method, computer program product, and computer system for improving latency in storage systems. A computer implemented method comprises receiving, by one or more processors, one or more write commands from a host. Determining, by the one or more processors, that one or more bits are not set for a grain associated to a write. Responsive to determining the one or more bits are not set for the grain associated to the write, sending, by the one or more processors, a message to node M requesting node M to set the one or more bits for the grain associated to the write. Requesting, by the one or more processors, write data be transferred from the host. Transferring, by the one or more processors, write data from the host. Submitting, by the one or more processors, the write data to a local storage. Replicating, by the one or more processors, the write data to a remote system and complete a write to the host, and notifying, by the one or more processors, node M to clear the one or more bits for the write after a predetermined delay.

A computer program product for improving latency in storage systems, the computer program product comprising, one or more computer readable storage devices and program instructions stored on the one or more computer readable storage devices, the stored program instructions comprising, program instructions to receive one or more write commands from a host. Program instructions to determine if one or more bits are not set for a grain associated to a write. Responsive to determining the one or more bits are not set for the grain associated to the write, program instructions to send a message to node M requesting node M to set the one or more bits for the grain associated to the write. Program instructions to request write data be transferred from the host. Program instructions to transfer write data from the host. Program instructions to submit the write data to a local storage. Program instructions to replicate the write data to a remote system and complete a write to the host, and program instructions to notify node M to clear the one or more bits for the write after a predetermined delay.

A computer system for improving latency in storage systems, the computer system comprising, one or more computer processors; one or more computer readable storage devices; program instructions stored on the one or more computer readable storage devices for execution by at least one of the one or more computer processors, the stored program instructions comprising program instructions to receive one or more write commands from a host. Program instructions to determine if one or more bits are not set for a grain associated to a write. Responsive to determining the one or more bits are not set for the grain associated to the write, program instructions to send a message to node M requesting node M to set the one or more bits for the grain associated to the write. Program instructions to request write data be transferred from the host. Program instructions to transfer write data from the host. Program instructions to submit the write data to a local storage. Program instructions to replicate the write data to a remote system and complete a write to the host, and program instructions to notify node M to clear the one or more bits for the write after a predetermined delay.

DETAILED DESCRIPTION

Embodiments of the present invention improve the art and/or field of replicating systems in storage systems by mixing together point-in-time copies, multiple ways to describe outstanding writes, and varied recovery mechanisms. Embodiments of the present invention can lower write latency compared to the known asynchronous replication solutions. For example, low memory use, zero additional storage operations, and close-to-minimal RPO (half of the roundtrip time between systems plus about 10-20 ms) may be achieved with certain embodiments of this invention.

Embodiments of the present invention enable very low latency host writes with asynchronous replication with no overhead above the same workload not being replicated in many cases. Synchronous replication has a lowered latency, though it cannot be lowered as much. However, embodiments of the present invention enable asynchronous replication to have a lower latency than synchronous replication at any distance. Further embodiments of the present invention enable replication with flash storage, without diluting the performance benefits of flash, improving latency in the art of replication and/or storage.

Figure 1:
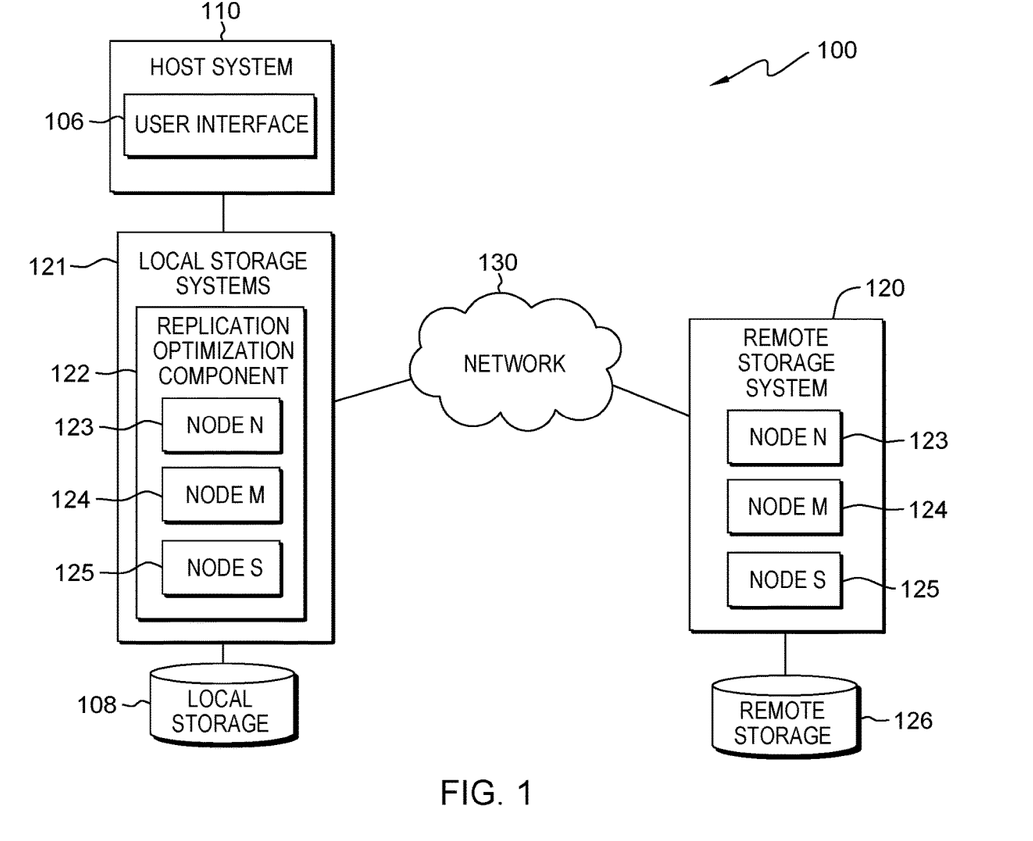
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments can be implemented. Many modifications to the depicted environment can be made by those skilled in the art without departing from the scope of the invention as recited by the claims.

Distributed data processing environment 100 includes host system 110, local storage system 121, ROC 122, local storage 108, remote storage 126 and server remote storage system 120, interconnected over network 130. Network 130 can be, for example, a telecommunications network, a local area network (LAN), a wide area network (WAN), such as the Internet, a wireless technology for exchanging data over short distances (using short-wavelength ultra high frequency (UHF) radio waves in the industrial, scientific and medical (ISM) band from 2.4 to 2.485 GHz from fixed and mobile devices, Ethernet, fiber channel, and building personal area networks (PANs) or a combination of the three, and can include wired, wireless, or fiber optic connections. Network 130 can include one or more wired and/or wireless networks that are capable of receiving and transmitting data, voice, and/or video signals, including multimedia signals that include voice, data, text and/or video information. In general, network 130 can be any combination of connections and protocols that will support communications between local storage system 121, remote storage system 120, other host systems, computing devices, remote computers, and/or remote servers (not shown in FIG. 1) within distributed data processing environment 100.

In various embodiments, host system 110 can be, but is not limited to, a standalone device, a server, a host, a laptop computer, a tablet computer, a netbook computer, a personal computer (PC), a smart phone, a desktop computer, a smart television, a smart watch, a radio, stereo system, a cloud based service (e.g., a cognitive cloud based service), and/or any programmable electronic host system capable of communicating with various components, devices, and/or other host systems within distributed data processing environment 100, via network 130 or any combination therein. In general, host system 110 is representative of any programmable mobile device or a combination of programmable mobile devices capable of executing machine-readable program instructions and communicating with users of other mobile devices via network 130 and/or capable of executing machine-readable program instructions and communicating with local storage system 121. In other embodiments, host system 110 can represent any programmable electronic host or combination of programmable electronic hosts capable of executing machine readable program instructions, manipulating executable machine readable instructions, and communicating with local storage system 121 and other hosts (not shown) within distributed data processing environment 100 via a network, such as network 130. Host system 110 includes an instance of user interface 106. Host system 110 and user interface 106 enable a user to interact with replication optimization component (ROC) 122 in various ways, such as sending program instructions, receiving messages, sending data, inputting data, editing data, correcting data and/or receiving data. In various embodiments, not depicted in FIG. 1, host system 110 can have one or more user interfaces. In other embodiments, not depicted in FIG. 1, distributed data processing environment 100 can comprise two or more hosts.

User interface (UI) 106 provides an interface to ROC 122 on local storage system 121 for a user of host system 110. In one embodiment, UI 106 can be a graphical user interface (GUI) or a web user interface (WUI) and can display text, documents, web browser windows, user options, application interfaces, and instructions for operation, and include the information (such as graphic, text, data, and/or sound) that a program presents to a user and the control sequences the user employs to control the program. In another embodiment, UI 106 can also be mobile application software that provides an interface between a user of host system 110 and local storage system 121. Mobile application software, or an "app," is a computer program designed to run on smart phones, tablet computers and other mobile devices. In an embodiment, UI 106 enables the user of host system 110 to send data, input data, edit data, correct data and/or receive data. In various embodiments, data can be a write.

In various embodiments, local storage system 121, host system 110, and/or remote storage system 120 can be on one or more Server computers. A server computer can be a standalone computing device, a management server, a web server, a mobile computing device, a host, and/or any other electronic device or computing system capable of receiving, sending, and processing data. In other embodiments, server computer can represent a server computing system utilizing multiple computers as a server system, such as in a cloud computing environment. In another embodiment, server computer can be a laptop computer, a tablet computer, a netbook computer, a personal computer (PC), a desktop computer, a personal digital assistant (PDA), a smart phone, or any other programmable electronic device capable of communicating with host system 110 and/or other computing devices (not shown) within distributed data processing environment 100 via network 130. In another embodiment, server computer represents a computing system utilizing clustered computers and components (e.g., database server computers, application server computers, etc.) that act as a single pool of seamless resources when accessed within distributed data processing environment 100. Server computer can include local storage system 121 and remote storage system 120. Server computer can include internal and external hardware components, as depicted, and described in further detail with respect to FIG. 3.

Remote storage 126 and local storage 108 can be a data repository and/or a database that can be written to and/or read by one or a combination of local storage system 121 and/or remote storage system 120. In the depicted embodiment, remote storage 126 physically resides near remote storage system 120. In another embodiment, remote storage 126 can reside elsewhere within distributed data processing environment 100 provided remote storage system 120 has access to remote storage 126, including within remote storage system 120. In various embodiments, local storage system 121 and remote storage system 120, can be a program or set of programs and/or a system or a set of systems responsible for managing, optimizing, replicating, and/or virtualizing local storage 108 and remote storage 126. In one particular embodiment, local storage 108 and remote storage 126 can be responsible for data storage and retrieval in a non-volatile fashion, which can enable local storage system 121, and remote storage system 120 as the main actors while local storage 108 and remote storage 126 play a minimal part. In the depicted embodiment, local storage 108 physically resides near to local storage system 121. In another embodiment, local storage 108 can reside elsewhere within distributed data processing environment 100 provided local storage system 121 has access to local storage 108, including within local storage system 121. Remote storage 126 and/or local storage 108 can be implemented with any type of storage device capable of storing data and configuration files that can be accessed and utilized by a server computer, such as a database server, a hard disk drive, or a flash memory. In other embodiments, remote storage 126 and/or local storage 108 can be hard drives, memory cards, computer output to laser disc (cold storage), and/or any form of data storage known in the art. In various embodiments, ROC 122 can store and/or retrieve data from and local storage 108 through the local storage system 121.

In various embodiments, remote storage system 120 can comprise node N 123, node M 124, and/or node S 125. In other embodiments remote storage system 120 can comprise one or more nodes not depicted in FIG. 1. In some embodiments, remote storage system 120 can be a storage system, wherein the storage system can be a clustered system responsible for taking read or write requests from the one or more host systems and applying them to the storage as appropriate. In other embodiments, the storage system is not a clustered system. In various embodiments, remote storage system 120 can receive a replicated write. In various embodiments, remote storage system 120 can be a DR system, in which it can be responsible for storing the replicated data on remote storage 126.

In various embodiments, ROC 122 can comprise node N 123, node M 124, and/or node S 125. In other embodiments ROC 122 can comprise one or more nodes not depicted in FIG. 1. In some embodiments, ROC 122 can be a storage system, wherein the storage system can be a clustered system responsible for taking read or write requests from the one or more host systems and applying them to the storage as appropriate. In other embodiments, the storage system is not a clustered system. In various embodiments, ROC 122 can replicate and/or store data on a storage system by receiving a write, sending a message requesting a number from a sequence number generator and/or primary server, receiving the sequence number from the sequence number generator, messaging another node in the cluster, receiving acknowledgment from the other node that the write has been recorded, applying the write to the local storage, replicating it to a remote system with the sequence number, and completing the write on the host. For example, node N 123 receives a write, node N 123 sends a message to the sequence number generator and/or primary server on node S 125 requesting a sequence number, node S 125 sends a reply back to node N 123 with a sequence number. At this point, node N 123 can send a message to another node in the cluster, node M 124, which shadows its non-volatile journal, containing the volume number, offset, and length of the write, together with the sequence number generated for the write. Node M 124 sends an acknowledgement back that it has recorded this write back to node N 123, and node N 123 applies the write to the local storage and replicates it to the remote system with the sequence number. Node N 123 determines the write is complete on the local storage, at which point it completes the write to the host. In other embodiments, the remainder of this process to free up the sequence number and clear the write from node M 124 journal can happen after the host has seen the write complete to ensure these processes don't affect write latency.

In various embodiments, ROC 122 can move data to a non-volatile bitmap. In one example, the first aspect is to remove the need for both nodes to know the exact details of every input/output (I/O). In this particular example, assuming both the production and DR copy are identical except for the writes that are outstanding on at least one system, ROC 122 simplifies the requirements of resynchronization following a glitch in replication where the set of applied writes is not known: for synchronous replication, those writes can be applied in any order on the DR system without making the DR copy inconsistent, meaning that any regions that might be different between the two copies can be replicated in any order. For asynchronous replication, the invention can capture the current state of the DR copy or copies using one or more point-in-time copies, copy any regions that might be different to the DR copy, and switch the data exposed externally from the point-in-time copy to the resynchronized DR copy (once the copy process completes) and effectively atomically update the data with consistency maintained. In various embodiments, both the synchronous replication and asynchronous replication, in combination, enable the maintenance of outstanding writes to be significantly simplified.

For asynchronous replication, the sequence number information no longer needs to be used to resynchronize while maintaining consistency following the failure of a node, which means that it does not need to be made non-volatile by copying it to another node in the system. In some embodiments, for either kind of replication (synchronous and/or asynchronous), there is no need to store/retain the specific location of each write, only which regions include data that may differ on the two copies and need resynchronization. Thus the non-volatile journal can be a bitmap that records regions that may differ between the two copies, and would need resynchronization in some circumstances. In various embodiments, a region can be called a grain. One or more grains in a volume can be fixed in size, and usually a power-of-2 number of sectors. In this particular embodiment, node N 123 can receive a write, node N 123 can send a message to node S 125 requesting a sequence number, in which case node S 125 can send a reply back to node N 123 with a sequence number Node N 123 can simultaneously send a message to node M 124 to record that there is a write outstanding for the grain, in which case node M 124 can send an acknowledgement back to node N 123 stating that node M 124 has recorded the write back to node N 123. Node N can apply the write to local storage 108 and/or remote storage 126 via remote storage system 120, in which case node N 123 can replicate the write to the remote system with the sequence number. In this particular embodiment, once node N 123 identifies and/or is made aware that the write is complete on local storage 108 and remote storage 126, node N 123 completes the write to the host. In this particular embodiment, the two messages at the beginning of the process can overlap, halving the additional latency for a write.

In various embodiments, ROC 122 can minimize the cost of the node N 123 to node M 124 bitmap messaging by lowering the latency impact of the message from node N 123 to node M 124 to record that the write is outstanding. In one particular embodiment, node M 124 is aware that there are one or more writes outstanding for a region, and node N 123 sends a message to node M 124 when the bit associated with a grain needs to change between zero and one, i.e. when there was previously no write in a grain, and now there is going to be at least one write outstanding in the grain. If there are multiple writes within a grain simultaneously, only the first write will enable the overhead of a node N 123 to node M 124 message. In this particular embodiment, delaying clearing the bit in node M 124 journal until sometime after the last write is completed within that grain increases the chance that the next write to that grain will happen with the bit still set, and therefore does not require sending the node N 123 to node 124 M message for the next write.

For example, adding a 5 ms delay between the last write in a grain completing and clearing the bit can enable the sequential writes to have the overhead of sending the message only once per grain. Therefore, in this particular example of 32 kB sequential writes to 1 MB grains, only one in 32 messages will send the message from node N 123 to node M 124 to set the bit. In other embodiments, one or more messages in 32 messages can send the message from node N 123 to node M 124 to set the bit. The lower the percentage of the writes requiring a grain set message, the lower the effective contribution to latency from this message: in this example, the contribution to latency from such messages is 1/32nd the actual round-trip time between nodes in the system. With a higher delay, for example a 1 second (s) delay between the last write in a grain completion and clearing that grain's bit, the bit would remain continually set for one or more "hot" grains regularly receiving writes at least once per second. Such writes would see no overhead from node N 123 to node M 124 messages.

In various embodiments, increasing the delay will decrease the fraction of writes that have the impact of node N 123 to node M 124 messages. The cost associated with increasing the delay is that a greater number of bits will be set in node M 124 journal at any time, meaning that if node M 124 is responsible for resynchronizing the production and DR copies, more copying will need to be done to guarantee that the two copies are identical. It would be possible to offer varying the delay as a user-configurable compromise between high performance in a steady state system, and rapid resynchronization if node N 123 fails. A second dimension of compromise is the size of the grain used. The larger the grain is, the more likely it is that a subsequent write will be submitted within a grain before the delay completes following an earlier write to that grain. A larger grain will also drive more copying if node M 124 has to resynchronize the copies. Whether increasing the delay or increasing the grain size can make a better improvement to write latency (given the amount of resynchronization required) will depend on the pattern of writes received to a volume: sequential writes and random writes with loose clustering can have a better improvement with larger grains, while more tightly clustered random writes can have a better improvement with a greater delay.

An additional improvement may be made by predictively setting bits in the journal for grains that are likely to receive writes in the near future. For example, if a sequential write process can be identified, the next grain to be written can have its bit set ahead of time. The hottest grains could have their bits permanently set. Such changes will also increase the amount of copying needed for resynchronization, but can entirely eliminate the impact of N to M messages for predictable workloads.

It is known in the art that the ordering of writes is achieved by assigning a sequence number to each write before it is either processed locally or replicated remotely. Many writes can share the same sequence number, but no two writes with the sequence number can depend on each other. "Depends" here refers to the host submitting one write as a result of an earlier write having completed back to the host. So it is not possible for one write with a given sequence number to have completed back to the host, then a subsequent write issued to the same volume to receive the same sequence number. In various embodiments, this requirement comes from the need to apply all the writes with the same sequence number simultaneously to the DR storage for maximum performance, and the DR volume must retain its consistency no matter what order the writes with that sequence number complete; however this requirement is not known in the art. Various embodiments, satisfy this requirement by neither sending the write to the DR system nor writing it to the production storage until the sequence number is granted, and only granting a particular sequence number for writes that are requesting one simultaneously.

In various embodiments, ROC 122 can refine this requirement to enable the write to be applied to the production storage (e.g., local storage 108 and/or remote storage 126 via remote storage system 120); before ROC 122 generates and/or assigns a sequence number to the write. In this particular embodiment, this means that the sequence of processing a write (ignoring the N to M message covered previously) becomes: node N 124 receives a write, node N 124 applies the write to the local storage 108 and/or remote storage 126 via remote storage system 120, node N 123 sends a message to node S 125 to ask for a sequence number, node S 125 replies with a sequence number for the write, node N 123 determines that is has received the sequence number for the write from node S 125 and that the write is complete on local storage 108 and/or remote storage 126, node N 123 completes the write to the host, and/or node N 123 replicates the write to a remote system, not depicted in FIG. 1.

In various embodiments, thus far, ROC 122 has enabled the write to the local storage 108 to take place in parallel with requesting the sequence number, and the message to set the bit on node M 124 to be omitted in many cases, however, this is still not optimal: writes to new grains can have the entirety of the node N 123 to node M 124 message roundtrip latency before the write can be applied, and with some configurations, the write can take less time than the node N 123 to node S 125 message. For example, it can take less than 0.1 ms to write to an all-flash storage array system, while node N 123 to node S 125 messages can often take >0.2 ms. In various embodiments, enabling these two actions to run in parallel with the host data transfer phase that is part of the small computer system interface (SCSI) write process can increase performance. In various embodiments, a SCSI write can result in the following behavior: host sends a SCSI write command (e.g., WRITE (10)) to storage system, the storage system identifies sufficient buffers to transfer the write data into, the storage system requests the data transfer from the host, the host transfers write data to the storage system, the storage system processes the write, and the storage system completes SCSI write command back to the host.

In various embodiments, including the node N 123 to node M 124, node N 123 to node S 125, and host write transfer improvements, the overall asynchronous replication comprises: the host and/or ROC 122 sends a SCSI write command to storage system node N 123; node N 123 can simultaneously send a message to node S 125 to ask for a sequence number, determine if the bit is set for the grain of the write/grain associated to the write and if not sends a message to M to set the bit, and/or requests the write data to be transferred from the host; transfer the write data from the host, receive a response and/or notification from node M 124 if request to set the bit was sent from node N 123, and enable node N 123 to submit the write to the local storage; send the write and the sequence number to remote storage system 120, complete the write on local storage 108, node N 123 sees/determines the completion of the replication to the remote storage system 120, node N 123 sends a message to node S 125 to free up the sequence number, and after a delay, node N 123 sends a message to node M 124 to clear the bit for the write if there are no more writes to that grain. In should be noted that grain of the write and grain associated to the write can be used interchangeably herein.

In various embodiments, synchronous replication comprises: the host sends SCSI write command to storage system node N 123; node N 123 can simultaneously check/determine if the bit is set for the grain of the write, and if the bit is not set for the grain of the write node N 123 can send a message to node M 124 to set the bit, and requests that the write data be transferred from the host; node N 123 can submit the write to the local storage and replicates the write to the remote system; when node N 123 can see/determine if the write to local storage 108 is complete, the write is completed to the host. When node N 123 can see/determine if the replication to the remote system 120 is complete, after a delay, node N 123 can send a message to node M 124 to clear the bit for the write if there are no more writes to that grain, improving the overall latency.

In a particular embodiment, if the host transfer latency is defined as Lh, the node N 123 to node M 124 message latency is defined as Lm, the node N 123 to node S 125 message latency is defined as Ls, the local write latency is defined as Ll, and the remote write latency is defined as Lr then: Latency for asynchronous replication without this invention is Ls+Lm+Lh+Ll; Latency for asynchronous replication with this invention is Max(Max(Lh, Lm)+Ll), Ls) for writes to grains without the bit set, or Max(Lh+Ll, Ls) for writes to grains with the bit already set; Latency for synchronous replication without this invention is Lm+Lh+Max(Ll, Lr); Latency for synchronous replication with this invention is Max(Lh, Lm)+Max(Ll, Lr) for writes to new grains, or Lh+Max (Ll, Lr) for writes to grains with the bit already set. In one example, the values are predetermined as Lh=80 microseconds (μs), Lm=120 μs, Ls=150 μs, and Ll=90 μs. In this particular example, without the improvements by ROC 122, the latency is 440 μs for writes to grains without the bit set; however with ROC 122, the latency is 210 μs for writes to grains without the bit set, or 170 μs for writes to grains with the bit set already. In this particular example, the most optimized scenario is latency with no replication overheads, in which the latency is 170 μs, wherein the overhead of the messages (e.g., node N 123 to node M 124, node N 123 to node S 125, etc.) is entirely hidden when the bit is already set, and reduced to less than one fifth if the bit still needs setting. In an example for synchronous replication, typical values at less than (<) 1 kilometer (km) replication distance are Lh=80 μs, Lm=120 μs, Ll=90 μs, Lr=200 μs. In this particular example, the latency is 400 μs; however, with ROC 122 the latency is 320 μs for writes to grains without the bit set, or 280 μs for grains with the bit set already.

Figure 2:
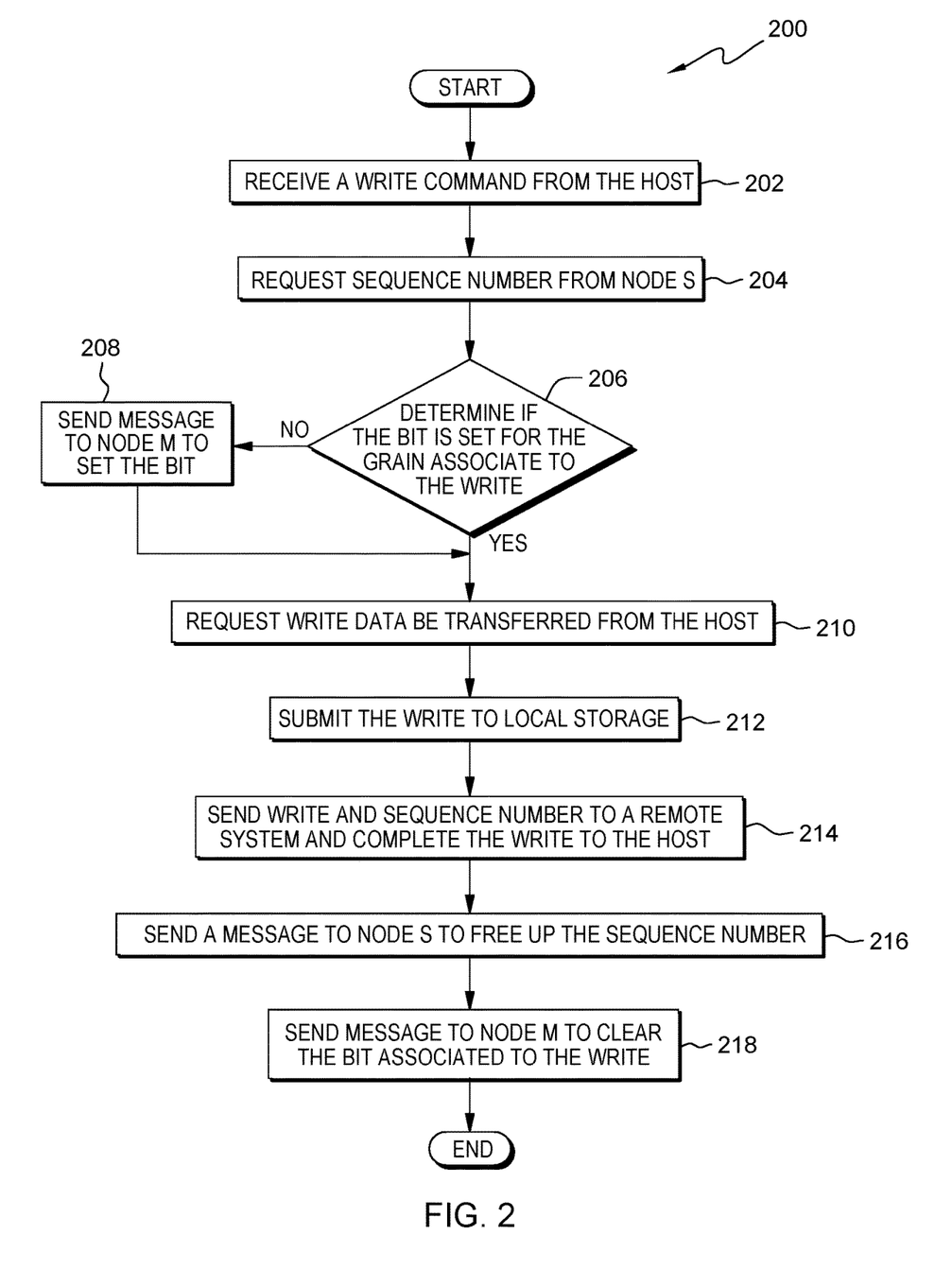
FIG. 2 is a flowchart depicting operational steps of replication optimization component (ROC) 122, on a local storage system within the distributed data processing environment of FIG. 1, in accordance with an embodiment of the present invention.

FIG. 2 is a flowchart depicting operational steps of ROC 122, on local storage system 121 within distributed data processing environment 100 of FIG. 2, in accordance with an embodiment of the present invention. It should be appreciated that FIG. 2 provides only an illustration of one implementation and does not imply any limitations with regard to the environments in which different embodiments can be implemented. Many modifications to the depicted environment can be made.

In step 202, node N 123 receives a write command. In various embodiments, node N 123 can receive one or more write commands.

In step 204, ROC 122 requests a sequence number from node S 125. In various embodiments, ROC 122, via N 123 can send one or more messages to node S 125 requesting one or more sequence numbers for one or more write commands and/or write data. In other embodiments, node N 123 can automatically send one or more messages to node S 125 requesting one or more sequence numbers for one or more write commands. In various embodiments, node S 125 and/or node N 123 can assign one or more sequence numbers to one or more write commands, write data, and/or writes. In this particular embodiment, node N 123 sends a message to node S 125 requesting a sequence number for a write command. In some embodiments, in addition to requesting one or more sequence numbers from node S 125, node N 123 can request the write data to be transferred from the host. In various embodiments, ROC 122 can generate and/or assign unique and/or specific sequence numbers for the write command to ensure that no write command has the same sequence number at any given time.

In step 206, ROC 122 determines if the bit is set for the grain associated to the write. In various embodiments, ROC 122, via node N, can determine and/or check if one or more bits are set for the grain associate to the write. In some embodiments, ROC 122 can instruct node N 123 to simultaneously perform steps 204, 206, and/or 208. In various embodiments, if ROC 122 determines that the one or more bits are not set for the grain associated to the write (No branch) then ROC 122, via N 123, can send a message to node M 124 to set the one or more bits (e.g., step 208); however, if ROC 122 determines that the one or more bits are set for the grain associated to the write (Yes Branch), ROC 122 will advance to step 210.

In step 208, ROC 122 sends a message to node M 124 to set the bit. In various embodiments, ROC 122, via node N 123, can send a message to node M 124 requesting that node M set/prepare one or more bits for grain associated to the write. In some embodiments, node M 124 can send an acknowledgement message to node N 123 that the one or more bits are set.

In step 210, ROC 122 requests the write data be transferred from the host. In various embodiments, ROC 122 can transfer write data from one or more hosts via node N 123. In step 212, ROC 122 submits the write data to local storage 108. In various embodiments, ROC 122 can submit one or more writes from one or more hosts on to local storage 108.

In step 214, ROC 122 sends the write and sequence number to remote system 120 and completes the write to the host. In various embodiments, ROC 122, via N 123, can send one or more writes and/or one or more sequence numbers to one or more remote systems (not depicted in environment 100). In this particular embodiment, node N 123 completes the write on local storage 108 while simultaneously receiving the sequence number from node S 125. Additionally, node N 123 can complete the write to the host. In various embodiments, once node N 123 determines/identifies that the write is complete on local storage 108 and that it has received the sequence number for the write from node S 125, node N 123 can complete the write to the host.

In step 216, ROC 122 sends a message to node S 125 to free up the sequence number. In one particular embodiment, ROC 122 can only send a message to node S 125 to free up the sequence number once node N 123 determines that the replication to the remote system 120 is complete. In some embodiments, node N 123 can confirm with ROC 122 that it has the received the sequence number from node S 125 prior to completing the write to the host, in which ROC 122 can enable and/or disable node N 123 from continuing. In various embodiments, node N 123 can send a message to node S 125 instructing node S 125 to free up/release the assigned sequence number.

In step 218, ROC 122 sends a message to node N 123 to clear the bit associated to the write. In various embodiments, node N 123 can send one or more messages to node M 124 to clear the bit for the write if there are no more writes pending on that particular grain. In some embodiments, node N 123 can have a predetermined delay to send one or more messages to node M 124 to clear the bit associated to the write to determine if there are no more writes pending on that particular grain. In some embodiments, node N 123 can determine if there are any more writes associated to a grain and based on a predetermined delay, in which node N 123 can instruct node M 124 clear the bit associated to the write. In this particular embodiment, if node N and/or node M determine there are more writes pending on that particular grain then steps 204, 206, and 210-218 can be repeated.

It should be noted that the communication between node N 123, node M 124, and node S 125 can be any form of communication known in the art and should not be limited to messaging in the disclosed embodiments.

Figure 3:
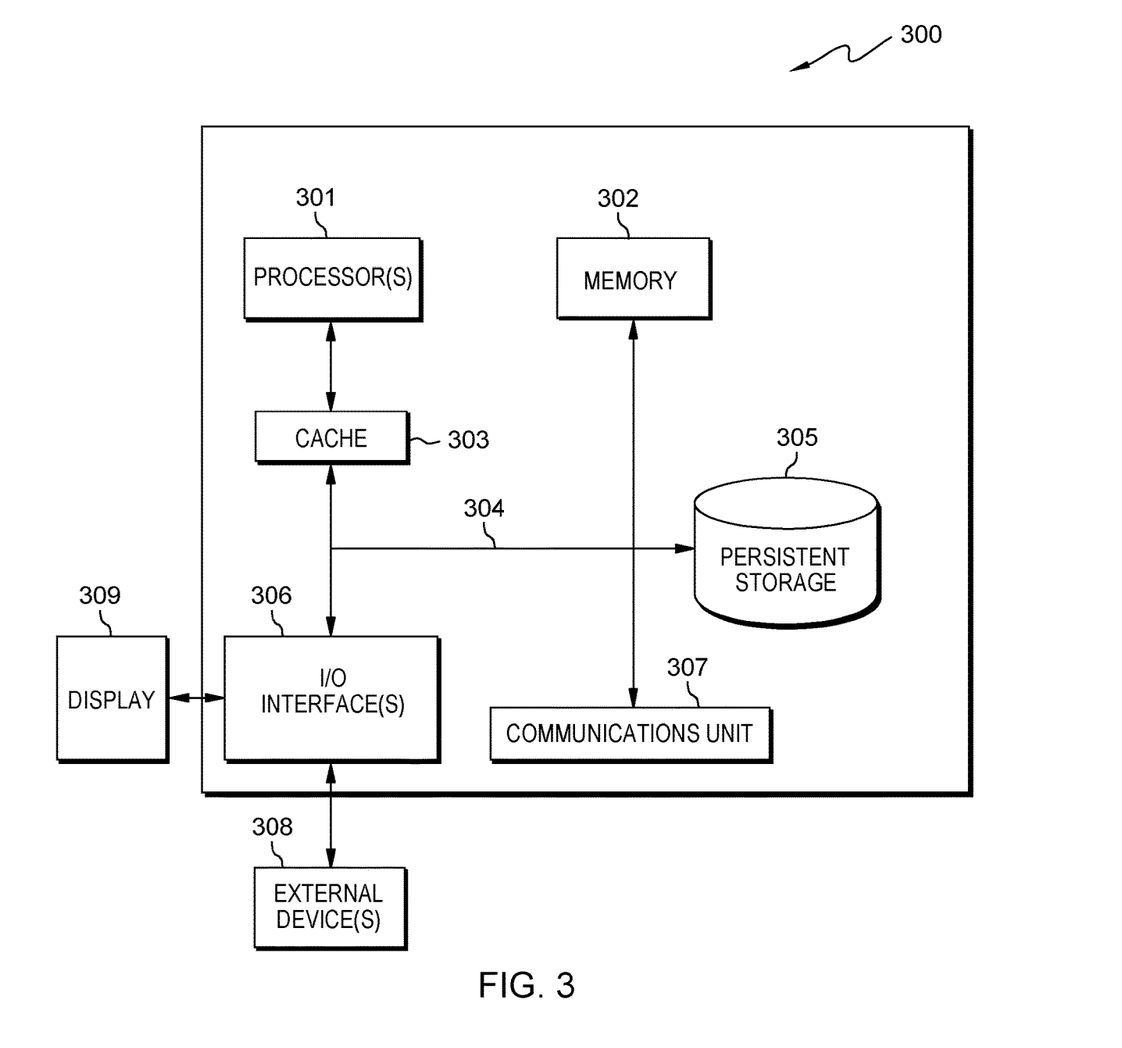
FIG. 3 is a block diagram of components of the server computer executing ROC 122 within the distributed data processing environment of FIG. 1, in accordance with an embodiment of the present invention.

FIG. 3 depicts a block diagram of components of server computers within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

FIG. 3 depicts computer system 300. The computer system includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention can be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 can also be removable. For example, a removable hard drive can be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 can provide communications through the use of either or both physical and wireless communications links. Program instructions and data used to practice embodiments of the present invention can be downloaded to persistent storage 305 through communications unit 307.

I/O interface(s) 306 enables for input and output of data with other devices that can be connected to each computer system. For example, I/O interface 306 can provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface (s) 306 also connect to display 309.

Display 309 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for improving latency in storage systems, the method comprising:

sending two messages, wherein a first message is sent to a node S requesting a sequence number, wherein the node S issues a reply back to a node N with a sequence number, wherein a second message is sent simultaneously to a node M instructing the node M to record a write outstanding for a grain, wherein responsive to determining one or more bits are not set for the grain associated to the write, sending, by one or more processors, the second message to the node M requesting the node M to set the one or more bits for the grain associated to the write, wherein the message shadows node M's non-volatile journal containing a volume number, offset, length of the write, and a sequence number generated for the write, and the node M issues an acknowledgement messaged back to the node N stating that the node M has recorded the write back to the node N;

predictively setting, by the one or more processors, the one or more bits in the non-volatile journal for the grains that are likely to receive writes, wherein predictively setting the one or more bits comprises:
preemptively setting the one or more bits in the non-volatile journal for the grains that are likely to receive writes;
transferring, by the one or more processors, write data from a host;
replicating, by the one or more processors, the write data to a remote system and completing the write to the host, wherein the two messages overlap, halving an additional latency for the write;
notifying, by the one or more processors, node M to clear the one or more bits for the write after a predetermined delay;
capturing a current state of a disaster recovery copy or copies using one or more point-in-time copies;
copying regions that are different from the disaster recovery copy; and
switching the write data exposed externally from the one or more point-in-time copies to a resynchronized disaster recovery copy.

2. The method of claim 1 further comprising:
determining, by the one or more processors, there are any more writes associated to a grain.

3. The method of claim 1, wherein the method is synchronous replication and further comprises:
generating, by the one or more processors, one or more unique sequence numbers for the one or more write commands.

4. The method of claim 3 further comprising:
assigning, by the one or more processors, a unique sequence number to at least one of: the one or more write commands, or the write data.

5. The method of claim 4 further comprising:
sending, by the one or more processors, the write data and one or more unique sequences numbers to a remote system.

6. The method of claim 5 further comprising:
sending, by the one or more processors, a request to node S instructing node S to clear the assigned unique sequence number.

7. The method of claim 6 further comprising:
clearing, by the one or more processors, the assigned unique sequence numbers.

8. A computer program product for improving latency in storage systems the computer program product comprising:
one or more computer readable storage devices and program instructions stored on the one or more computer readable storage devices, wherein the one or more computer readable storage devices are a non-transitory medium, the stored program instructions comprising:
program instructions to send two messages, wherein a first message is sent to a node S requesting a sequence number, wherein the node S issues a reply back to a node N with a sequence number, wherein a second message is sent simultaneously to a node M instructing the node M to record a write outstanding for a grain, wherein responsive to determining one or more bits are not set for the grain associated to the write, program instructions to send the second message to the node M requesting the node M to set the one or more bits for the grain associated to the write, wherein the message shadows node M's non-volatile journal containing a volume number, offset, length of the write, and a sequence number generated for the write, and the node M issues an acknowledgement messaged back to the node N stating that the node M has recorded the write back to the node N;
program instructions to predictively set the one or more bits in the non-volatile journal for the grains that are likely to receive writes, wherein predictively setting the one or more bits comprises;
program instructions to preemptively set the one or more bits in the non-volatile journal for the grains that are likely to receive writes;
program instructions to transfer write data from a host;
program instructions to replicate the write data to a remote system and completing the write to the host, wherein the two messages overlap, halving an additional latency for the write;
program instructions to notify node M to clear the one or more bits for the write after a predetermined delay;
program instructions to capture the current state of a disaster recovery copy or copies using one or more point-in-time copies;
program instructions to copy regions that are different from the disaster recovery copy; and
program instructions to switch the write data exposed externally from the one or more point-in-time copies to a resynchronized disaster recovery copy.

9. The computer program product of claim 8 further comprising:
program instructions to determine if there are any more writes associated to a grain.

10. The computer program product of claim 8, wherein the method is synchronous replication and further comprises:
program instructions to generate one or more unique sequence numbers for the one or more write commands.

11. The computer program product of claim 10 further comprising:
program instructions to assign a unique sequence number to at least one of: the one or more write commands, or the write data.

12. The computer program product of claim 11 further comprising:
program instructions to send the write data and one or more unique sequences numbers to a remote system.

13. The computer program product of claim 12 further comprising:
program instructions to send a request to node S instructing node S to clear the assigned unique sequence number.

14. The computer program product of claim 13 further comprising:
program instructions to clear the assigned unique sequence numbers.

15. A computer system for improving latency in storage systems, the computer system comprising:
one or more computer processors;
one or more computer readable storage devices;
program instructions stored on the one or more computer readable storage devices for execution by at least one of the one or more computer processors, wherein the one or more computer readable storage devices are a non-transitory medium, the stored program instructions comprising:
program instructions to send two messages, wherein a first message is sent to a node S requesting a sequence number, wherein the node S issues a reply back to a node N with a sequence number, wherein a second message is sent simultaneously to a node M instructing the node M to record a write outstanding for a grain, wherein responsive to determining one or more bits are not set for the grain associated to the write, program instructions to send the second message to the node M requesting the node M to set the one or more bits for the grain associated to the write, wherein the message shadows node M's non-volatile journal containing a volume number, offset, length of the write, and a sequence number generated for the write, and the node M issues an acknowledgement messaged back to the node N stating that the node M has recorded the write back to the node N;

program instructions to predictively set the one or more bits in the non-volatile journal for the grains that are likely to receive writes, wherein predictively setting the one or more bits comprises;

program instructions to preemptively set the one or more bits in the non-volatile journal for the grains that are likely to receive writes;

program instructions to transfer write data from a host;

program instructions to replicate the write data to a remote system and completing the write to the host, wherein the two messages overlap, halving an additional latency for the write;

program instructions to notify node M to clear the one or more bits for the write after a predetermined delay;

program instructions to capture the current state of a disaster recovery copy or copies using one or more point-in-time copies;

program instructions to copy regions that are different from the disaster recovery copy; and    program instructions to switch the write data exposed externally from the one or more point-in-time copies to a resynchronized disaster recovery copy.

16. The computer system of claim 15, wherein the method is synchronous replication and further comprises:

program instructions to generate one or more unique sequence numbers for the one or more write commands.

17. The computer system of claim 16 further comprising:

program instructions to assign a unique sequence number to at least one of: the one or more write commands, or the write data.

18. The computer system of claim 17 further comprising:

program instructions to send the write data and one or more unique sequences numbers to a remote system.

19. The computer system of claim 18 further comprising:

program instructions to send a request to node S instructing node S to clear the assigned unique sequence number.

20. The computer system of claim 19 further comprising:

program instructions to clear the assigned unique sequence numbers.

\* \* \* \* \*